United States Patent [19]

Jönsson

[11] Patent Number: 4,655,656

[45] Date of Patent: Apr. 7, 1987

[54] FASTENING DEVICE FOR DOOR OR WINDOW FRAMES

[75] Inventor: Nils-Arne Jönsson, Brämhult, Sweden

[73] Assignee: AB Essve Produkter, Kista, Sweden

[21] Appl. No.: 897,874

[22] Filed: Aug. 19, 1986

Related U.S. Application Data

[63] Continuation-in-part of Ser. No. 740,907, Jun. 3, 1985, abandoned.

[51] Int. Cl.⁴ .................. F16B 21/00; F16B 35/00; F16B 23/00
[52] U.S. Cl. ........................ 411/337; 411/384; 411/395; 411/402; 411/911
[58] Field of Search .......... 411/178, 337, 352, 366, 411/368, 383, 384, 395, 397, 412, 413, 424, 426, 911

[56] References Cited

U.S. PATENT DOCUMENTS

| | | | |
|---|---|---|---|
| 470,804 | 3/1892 | Johansson | 411/427 X |
| 1,251,676 | 1/1918 | McCaffray | 411/368 |
| 1,842,741 | 1/1932 | Begtsson | 411/911 X |
| 1,925,667 | 9/1933 | Kirton | 411/911 X |
| 2,008,229 | 7/1935 | Sharp | 411/424 |
| 2,441,442 | 5/1948 | Place et al. | 411/259 |
| 2,639,179 | 5/1953 | Phelps | 411/178 X |
| 4,486,134 | 12/1984 | White | 411/178 X |

FOREIGN PATENT DOCUMENTS

| | | | |
|---|---|---|---|
| 810315 | 8/1951 | Fed. Rep. of Germany | 411/72 |
| 216085 | 2/1967 | Sweden | 411/366 |
| 394719 | 3/1973 | Sweden | 411/366 |
| 262504 | 12/1949 | Switzerland | 411/178 |

*Primary Examiner*—Thomas J. Holko
*Attorney, Agent, or Firm*—Witherspoon & Hargest

[57] ABSTRACT

A device for adjustably fastening a door or window frame or the like to a fixed element, including a screw-like device having threads which engage the fixed element and a threaded sleeve member, displaceably arranged on the screw-like device, which engages the frame.

1 Claim, 4 Drawing Figures

FASTENING DEVICE FOR DOOR OR WINDOW FRAMES

TECHNICAL FIELD

This application is a continuation-in-part of Ser. No. 06/740,907, 6-3-85 now abandoned.

This invention relates to a device for the adjustable fastening of door or window frames or the like to fixed elements, including a screw means provided with threads for engagement with the fixed element and a sleeve-shaped part provided with threads for engaging with the frame part.

BACKGROUND ART

Devices of the type mentioned are already known, e.g. from Swedish Pat. No. 216.085 and U.S. Pat. No. 4,486,134. By these known fastening devices the sleeve and screw means can be turned together with the aid of a tool, so that the sleeve will penetrate into the frame and the screw means into the fixed element, and the sleeve (Swedish Pat. No. 216 085) or the screw means (U.S. Pat. No. 4,486,134) can also be turned itself with the aid of another tool for adjusting the position of the frame in relation to the fixed element.

These known devices enable a desired adjustment but necessitate the employment of two different tools, i.a. one tool for applying the device and another tool for carrying out the adjustment. Moreover both these known devices require the employment of one specifically designed tool without which the device cannot be applied. For the device according to Swedish Pat. No. 216 085 a specifically designed tool is also required for carrying out the adjustment. This is a clear disadvantage since it not only necessitates the formation of engagement surfaces for two different tools by the manufacture of the device, but also makes it impossible to apply and adjust the device with the aid of ordinary tools normally used by craftsmen. Moreover the necessity to emply two different tools naturally also renders the application and adjustment of the device more cumbersome and thus expensive.

DISCLOSURE OF INVENTION

The object of the invention is to provide a fastening device of simple construction which furthermore only necessitates the use of one conventional tool, such as a screw-driver. This is provided by the sleeve-shaped part being arranged axially displaceable on the screw means and by the screw head and the sleeve being provided with mating engagement means so that in a first position the sleeve engages the screw means to accompany the screw means in its turning movement, while in its second position it does not accompany the turning movement of the screw means.

BRIEF DESCRIPTION OF DRAWINGS

This invention will now be described more closely below with reference to the accompanying drawings on which

BEST MODE FOR CARRYING OUT THE INVENTION

Figure 1:
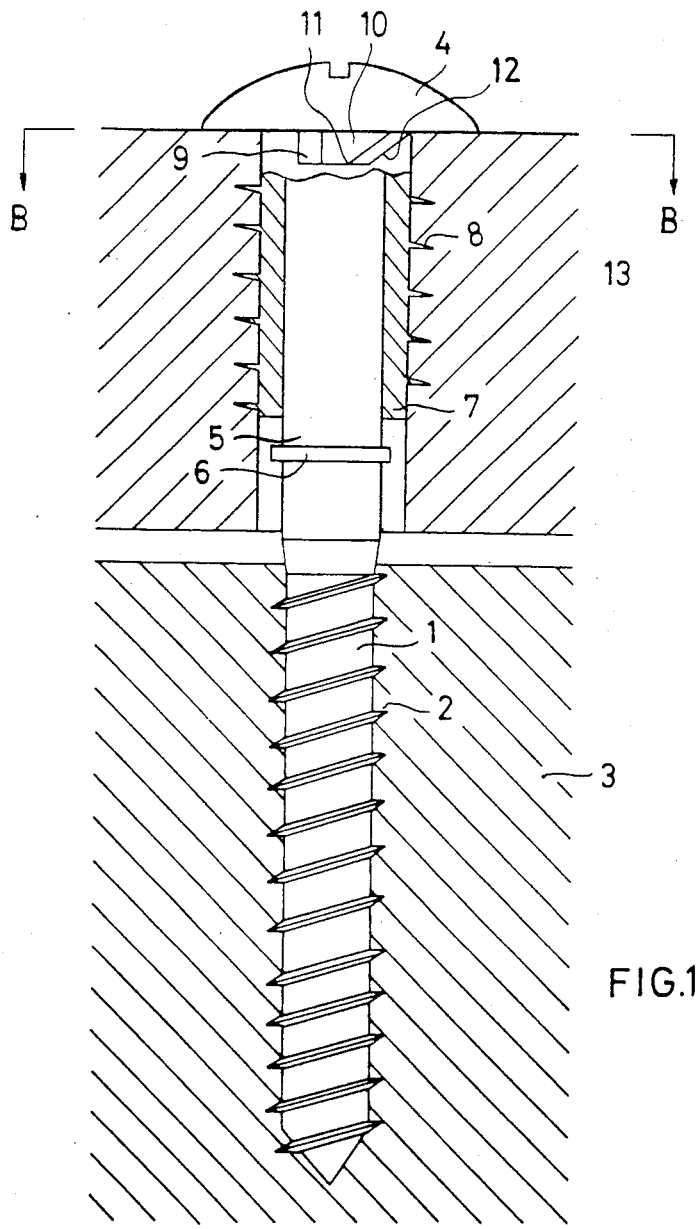
FIG. 1 illustrates a first embodiment of the fastening device partially in section and in a position where the sleeve part is in engagement with the screw means.
Figure 2:
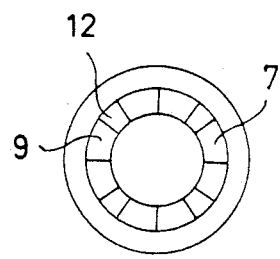
FIG. 2 illustrates the sleeve part of FIG. 1 seen in the direction of the arrow B.
Figure 3:
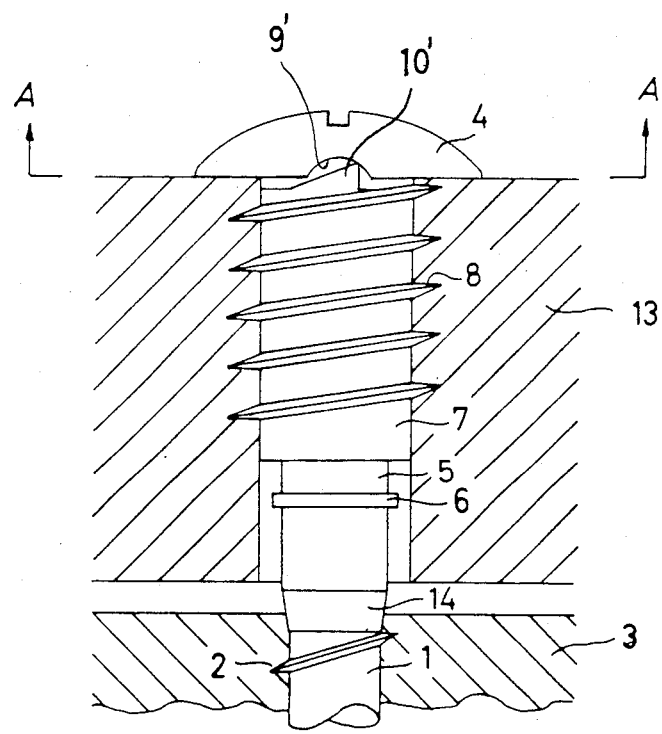
FIG. 3 illustrates another embodiment of the fastening device in a side view with the sleeve part in its engagement position.
Figure 4:
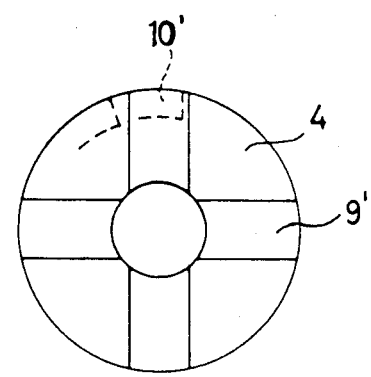
FIG. 4 illustrates the screw head of FIG. 3 seen in the direction of the arrow A.

The inventive fastening device is illustrated in FIG. 1 in a partially sectioned side view. A screw means is denoted by the numeral 1 and is provided with a thread portion 2 for screwing into a fixed element 3, with a screw head 4 and with a smooth cylindrical portion 5 between the screw head and shoulder 6. On the smooth part 5 there is arranged a sleeve 7 provided with a thread 8, which can be displaced between the shoulder 6 and the screw head 4. The shoulder 6 on screw means 1 only acts as a stop for the downward movement of the sleeve 7 and its specific shape is not of vital importance. Thus the shoulder is only illustrated very schematically in the drawings and in practice it could be given any suitable shape, i.e. depending upon by which method it is formed, other than the illustrated sharp-edge shape. The sleeve 7 and the head 4 are implemented at their contiguous surfaces such that when the screw head is turned in one direction, e.g. clockwise, the sleeve is taken with it, whereas if it is turned in the opposite direction the sleeve 7 and head 4 glide against each other. According to one embodiment illustrated in FIG. 1, the sleeve 7 is provided with recesses 9 on its end facing towards the screw head 4. These recesses 9 are engaged by projections 10 on the screw head and are formed such that on turning the screw head in one direction, e.g. clockwise, the sleeve accompanies the head, while on turning in the other direction the edge 11 of the projection 10 glides along the sloping surface 12 of the recess so that the head 4 is lifted out of engagement with the sleeve part, and the screw means 1 can be turned without the sleeve 7 accompanying it. It is, however, just as possible to have the screw head provided with recesses 9' and the sleeve with projections 10' having sloping defining surfaces. (FIG. 3)

The frame 13 is pre-bored to a suitable diameter for allowing the sleeve 7 to be driven into the hole with its thread 8 engaging the frame 13. The screw means 1 is first inserted through the hole in the frame 13 and is then screwed into the fixed element 3 which need not be pre-bored. On continued driving of the screw head the sleeve 7 is driven into the pre-bored hole in the frame. When the screw means has been driven in to a depth such that the frame is approximately in the desired position, adjustment takes place by the screw head 4 being turned anticlockwise. The sleeve 7 then does not accompany the screw means 1, but the latter is screwed out until the frame 13 has reached the desired distance from the fixed element. At the places where the distance between the frame and the fixed element is too great, the screw means is driven deeper into the fixed element.

I claim:

1. Device for adjustable fastening of door or window frames or the like to fixed elements, including a screw means provided with a thread for engagement with the fixed element, a screw head and a sleeve provided with a thread for engagement with the frame part, characterized in that the sleeve (7) is displaceably arranged on the screw means (1) between the screw head (4) and a shoulder (6) on the screw means (1), the sides facing each other of the sleeve (7) and of the screw head (4)

being provided with recesses (9) and projections (10) respectively, or vice versa which on turning the screw head (4) in one direction by engaging each other drive the sleeve (7), so that is can be screwed into the frame position, whereas on turning in the opposite direction the recesses and the projections glide over sloping surfaces out of engagement with each other so that the screw means (1) can be freely turned in relation to the sleeve (7).

* * * * *